F. BARTELS.
HARVESTER.
APPLICATION FILED MAR. 29, 1918. RENEWED JULY 26, 1920.
1,369,376.
Patented Feb. 22, 1921.
4 SHEETS—SHEET 3.
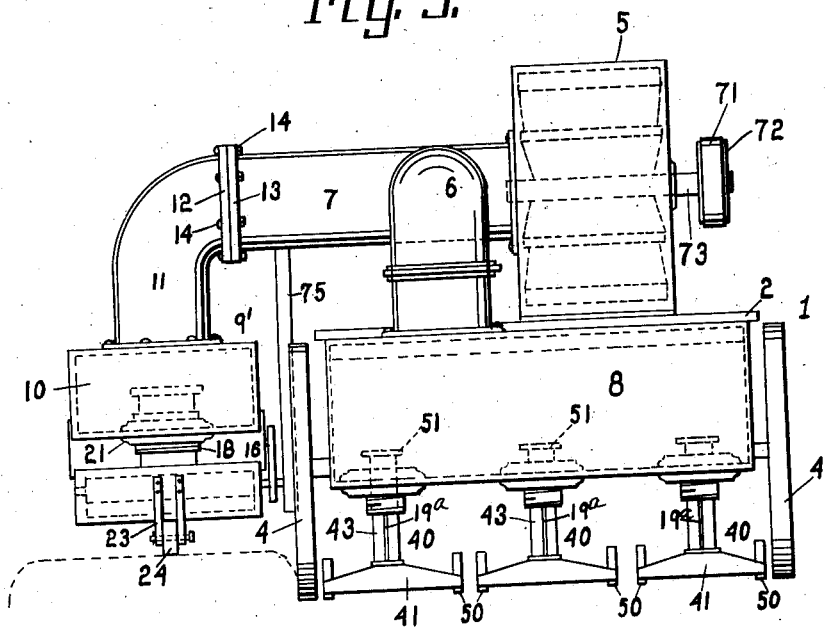
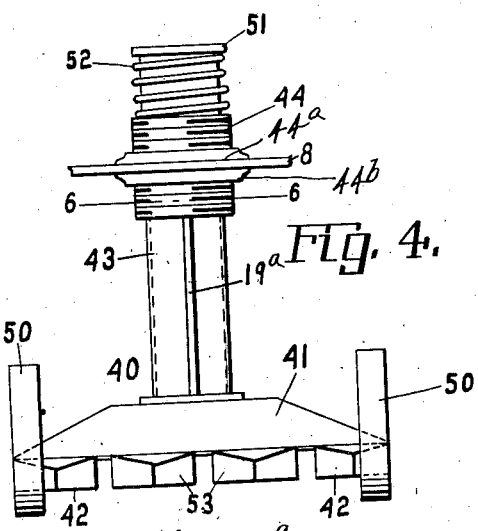
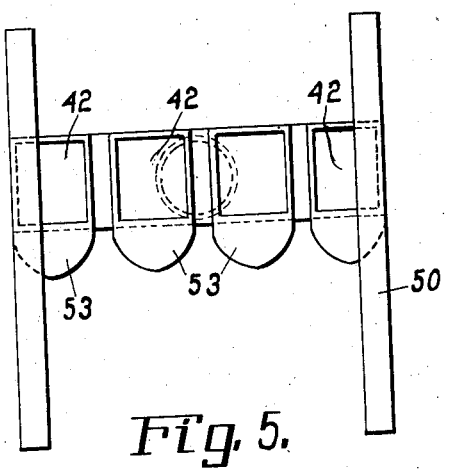
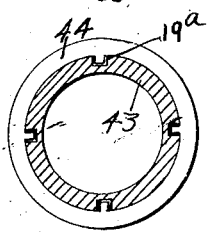
Inventor
Frank Bartels.
By Harry O. Schroeder
Attorney

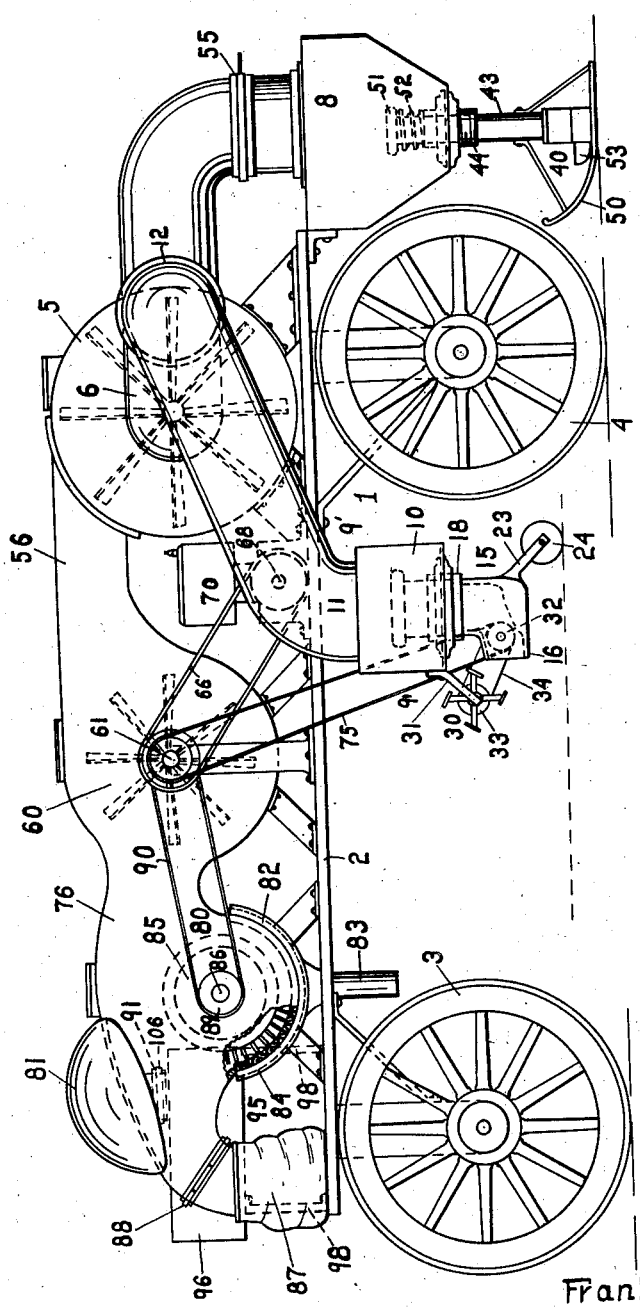

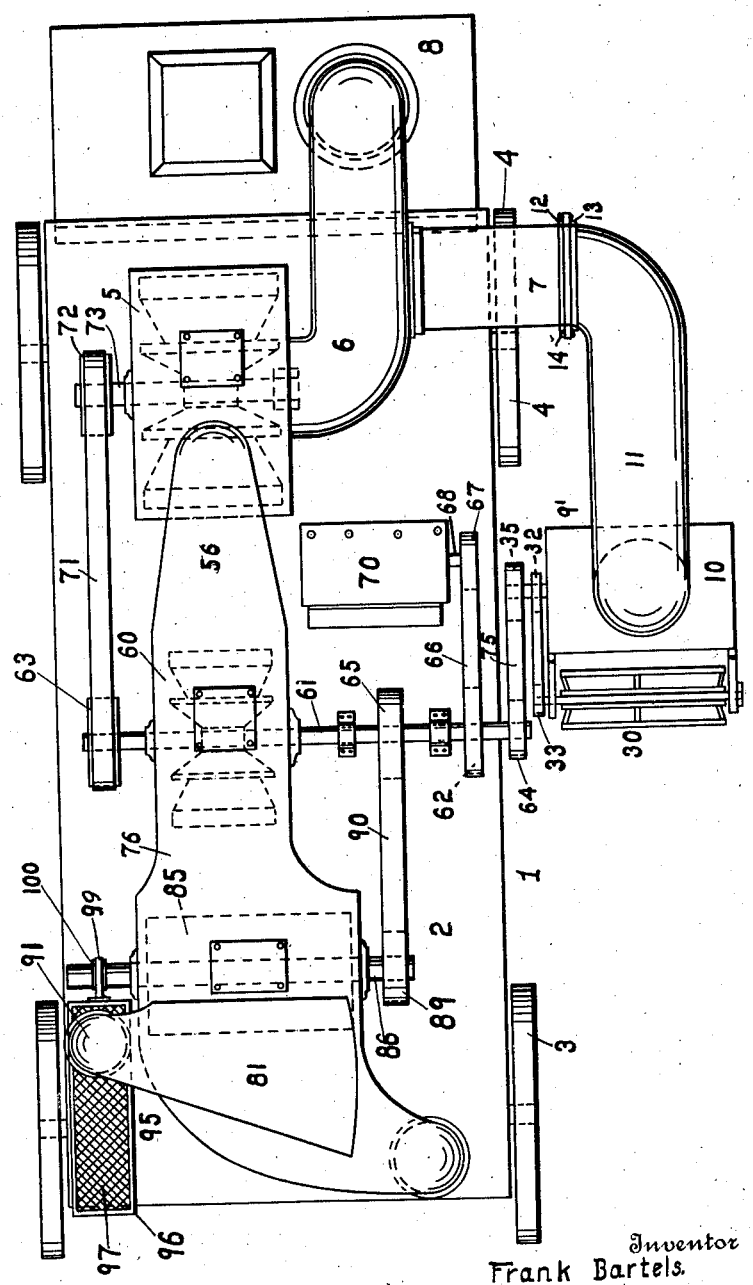

F. BARTELS.
HARVESTER.
APPLICATION FILED MAR. 29, 1918. RENEWED JULY 26, 1920.

1,369,376.

Patented Feb. 22, 1921.
4 SHEETS—SHEET 4.

Inventor
Frank Bartels.

By Harry C. Schroeder
Attorney

UNITED STATES PATENT OFFICE.

FRANK BARTELS, OF OAKLAND, CALIFORNIA.

HARVESTER.

1,369,376.

Specification of Letters Patent. Patented Feb. 22, 1921.

Application filed March 29, 1918, Serial No. 225,385. Renewed July 26, 1920. Serial No. 399,161.

*To all whom it may concern:*

Be it known that I, FRANK BARTELS, citizen of the United States, residing at Oakland, in the county of Alameda and State of California, have invented certain new and useful Improvements in Harvesters, of which the following is a specification.

My invention is a harvester and gatherer, particularly adapted for harvesting rice, and gleaning cereal seed from a field after the cereal of the field has been harvested.

In this specification and the annexed drawings, I disclose my invention in the form which I consider the best, but I do not limit my invention to such form because it may be embodied in other forms and it is to be understood that in and by the claims following the description herein, I intend to cover my invention in whatever form it may be embodied.

Referring to the drawings:

Figure 1 is a side elevation of my invention.

Fig. 2 is a plan view of my invention.

Fig. 3 is a rear view thereof.

Fig. 4 is an elevation of one of the gleaning units.

Fig. 5 is a plan of the under side of said gleaning unit.

Fig. 6 is a cross section of said gleaning unit taken on line 6—6 of Fig. 4.

Figure 7:
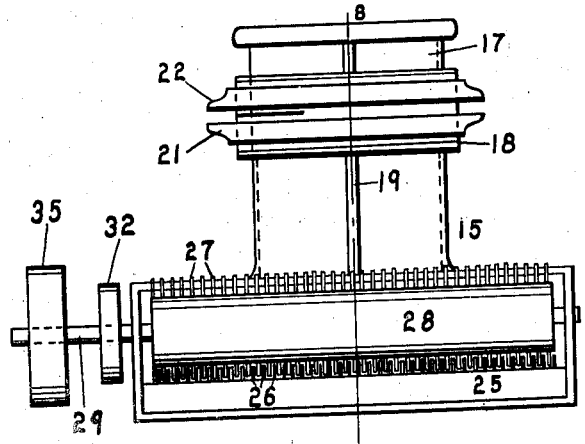
Fig. 7 is a front elevation of a rice harvester unit.
Figure 8:
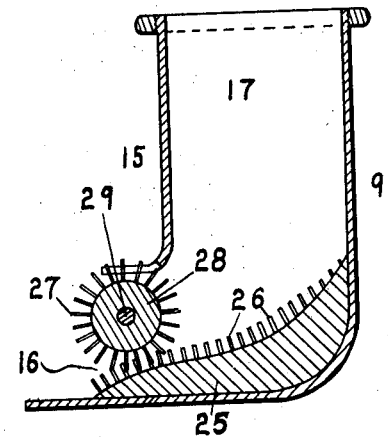
Fig. 8 is a vertical section of said harvester.

In the drawing, 1 indicates a truck including a body 2 and front and rear wheels 3 and 4 upon which said body is mounted. Said truck may be drawn or driven over a field in any suitable obvious manner. On the rear of said truck body is mounted a gleaning harvester unit 9, which includes a hopper 8 having a connection through a duct 6, to a suction motor 5, disposed on a rear portion of the truck. Another harvester unit 9' is detachably mounted on the truck and arranged at one side thereof. Said harvester unit 9' includes a hopper 10, supported in any suitable manner, connected to the duct 6 by ducts 7 and 11, which are bolted together by bolts 14 whereby the harvester unit 9' is detachably mounted on the truck 1. A harvester unit 15 is mounted on the unit 9'. The unit 15 has a mouth 16 and a throat 17 leading upwardly therefrom into the hopper 10 through an externally threaded sleeve 18 fitted in an opening in the lower wall of said hopper. Vertical longitudinal grooves are provided in the throat 17 into which project lugs 19 from the sleeve 18 whereby the unit 15 is prevented from turning in the sleeve 18 with relation to the truck 1, the sleeve being maintained rigidly in the lower wall of hopper 10 by nuts 21 and 22 screwing on said sleeve against the lower and upper faces of the lower wall of the hopper 10. A leg 23 depends from the rear of the unit 15 in the lower end of which is journaled a roller 24 which rolls along the ground and sustains the unit at the desired elevation as it travels.

A gatherer 25 is located in the mouth 16, said gatherer including rows of stationary pins 26, extending from the lower wall of the front of the mouth 16 to the rear wall of the throat 17, and rows of pins 27 on a rotary drum 28 on shaft 29 journaled in the side walls of mouth 16, said rows of pins being arranged to rotate between the rows of stationary pins 26. A beater 30 is journaled in front of the mouth 16 and the gatherer 25, in brackets 31 depending from the front of hopper 10 for directing the heads of the rice plants into the mouth 16 and picker 25. Pulleys 32 and 33 are respectively secured on the drum shaft 29 and to the beater 30 over which pulleys travels a belt 34. A sprocket 35 is also secured on drum shaft 29.

A plurality of gleaning units 40 are mounted in the hopper 8. Each of said gleaning units includes an inverted funnel member 41 having a plurality of depending mouths 42 at its lower enlarged end and spaced laterally apart at a slight distance, and having a cylindrical stack 43, which stack extends upwardly into the hopper 8 through externally threaded sleeve 44 fitted in an opening in the lower wall of said hopper. Vertical longitudinal grooves 19$^a$ are provided in the stacks 43 into which project lugs or ribs 20 from the sleeves 44 whereby the gleaning units 40 are prevented from turning in said sleeves, the sleeves being maintained rigidly in the lower wall of the hopper 8, by nuts 44$^a$ and 44$^b$, threaded thereon against the lower and the upper faces of said wall of the hopper. Runners 50 are secured to the sides of the funnels 41 which run on the ground and hold the mouths 42 of the funnels slightly above the surface of the ground. External flanges 51 are provided at the top of the stacks 43 and springs 52 surround said stacks between the top of the sleeves 44 and said flanges which sustain most of the weight of the gleaning units 40 so that the runners 50 bear lightly on the ground, thus enabling the units to move up and down very readily to adapt themselves to the irregular surface of the ground. Pointed spreaders 53 are located forwardly of the funnel mouths 42 for spreading the stubble so that it will pass through the spaces between the mouths 42 and allow the seed to be readily drawn off the ground into the funnel mouths 42. A slide valve 55 is located in the duct 6 beyond the duct 7 and near the hopper 8 for controlling the operation of the gleaning units.

A duct 56 leads from the suction motor 5 to a suction motor 60. On the shaft 61 of suction motor 60 are secured pulleys 62 and 63, sprocket 64 and pulley 65. A belt 66 passes over pulley 62 and pulley 67 on drive shaft 68 of gas engine 70 mounted on truck body 2 whereby the shaft 61 and motor 60 are driven. A belt 71 passes over pulley 63 and pulley 72 on shaft 73 of suction motor 5 whereby said motor is driven from shaft 61. A chain 75 passes over sprockets 64 and 35, whereby the harvester 9 is operated.

A duct 76 leads from suction motor 60 and communicates with a sifter 80 and a hood 81 arranged above and forwardly of said sifter. The sifter 80 includes a trough 82, having an outlet 83, a screen 84 arranged slightly above the bottom of the trough, and a toothed agitator 85 mounted on a shaft 86 journaled in the side walls of the sifter, the teeth of which agitator engaging said screen to sift the dirt from the cereal through said screen into said trough and out through said outlet. A bag 87 slips over the forward end of duct 76 and rests upon the truck body to receive the cereal after it has been harvested or gleaned and passed through the sifter 80 and the dirt sifted therefrom. A slide valve 88 is interposed in the duct 76 in advance of the sifter. A pulley 89 is secured on the sifter shaft 86 over which and the pulley 65 passes a belt 90. A duct 91 leads from the hood 81 to an auxiliary sifter 95. Said sifter includes a tray 96 having a screen bottom 97 and mounted on spring legs 98 secured to the truck body 2. An eccentric 99 secured to the sifter tray 96 surrounds an eccentric 100 secured to sifter shaft 86 whereby the tray is shaken backward and forward on its spring legs to sift the dirt out of the cereal that enters the tray from the duct 91. A side valve 106 is placed in the duct 91 to control the delivery of the cereal from the hood 81 and the sifter 95.

Figure 9:
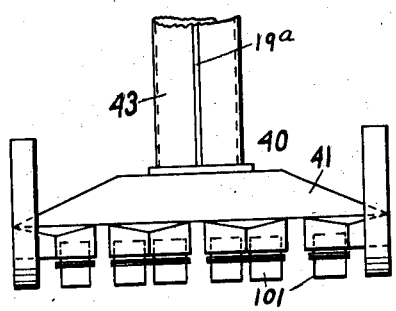
Fig. 9 is a fragmentary elevation of the lower part of a modified form of gleaning unit.
Figure 10:
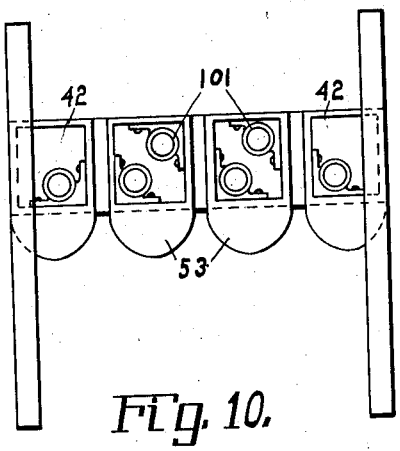
Fig. 10 is a lower plan view of said modified gleaning unit.
Figure 11:
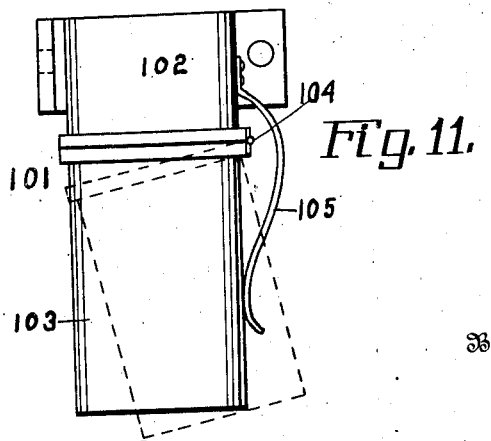
Fig. 11 is a view of one of the nozzles of said modified gleaning unit.

In the modified gleaning unit shown in Figs. 9 to 11 inclusive, nozzles 101 depend from the mouths 42 of said units to project into furrows and convey the seed from said furrows into the funnel 41. Said nozzles include an upper member 102 bolted to the walls of the mouths 42 and a lower member 103 hinged by hinge 104 at the rear of member 102 so that if said lower member strikes a lump of ground it may swing backwardly and pass over the lump. A spring 105 secured to member 102 engages lower member 103, whereby said lower member is normally maintained vertically and is returned to vertical position when it has been swung backwardly by a lump of earth and has passed over the lump.

The rice harvested by the harvester 9 is drawn by the suction motor 5 through hopper 10, and ducts 11, 7 and 6 into the suction motor 5, whereupon the suction motor 60 draws the cereal through duct 76 and sifter 80 and delivers it into bag 87 or sifter 95, as desired, the delivery of the cereal being controlled by valves 88 and 106. If the sifting of the cereal by the sifter 80 is sufficient the valve 106 is closed and valve 88 is opened to allow the cereal to enter the bag. If a finer sifting is desired the valve 88 is closed and valve 106 is opened to deliver the cereal into the sifter 95.

The harvester may be removed from the truck by removing the bolts 14 from the flanges 12 and 13 and by removing the chain 75 from either sprocket 35 or 64.

For gleaning the valve 55 is opened; the suction motor 5 draws the seed through the mouths 42, into funnels 41, up stacks 43, into hopper 8, through duct 6 and into said motor whereupon the motor 60 conducts the seed from motor 5 to the bag 87 or sifter 95 as described.

Having described my invention, I claim as new and desire to secure by Letters Patent:

1. A machine for harvesting rice and the like comprising a truck, two harvester units on the truck, one comprising a gleaning unit arranged in alinement with the line of draft and the other comprising a beater mechanism arranged at one side of the truck, suction means on the truck connected with said units for conveying the harvested material therefrom to a point of delivery, and means for selectively rendering the harvester units inoperative, said second harvesting unit being detachable from the truck and the suction means.

2. A harvester of the character described comprising a truck, a primary harvester unit comprising a beater mechanism mounted on the truck, a gleaner unit on the truck to the rear of the harvester unit, means on the truck for separating the grain or cereal from the dirt and chaff and means for conveying the gathered material from the units through said separating means to a point of delivery.

3. A harvester of the character described comprising a truck, a primary harvester unit comprising a beater gathering mechanism on the truck, a suction gleaner unit also on the truck in alinement with the line of draft, the harvester unit being to one side of the truck, and suction means connected with said units on the truck for conveying the harvested material therefrom to a point of delivery.

4. A harvester of the character described comprising a truck, a detachable primary harvester unit comprising a beater mechanism mounted on the truck, a suction gleaner unit on the truck, suction means for conveying the harvested material to a point of delivery on the truck, and means for controlling the operation of the gleaner unit.

5. In a gleaning machine, a truck, a gleaning unit mounted on said truck to move vertically, a spring for partially sustaining the weight of said unit and means on said unit for engaging the surface of the ground, said unit being thus enabled to move up and down over the irregular surface of the ground and means for drawing the cereal through said unit.

6. In a gleaning machine, a truck, a gleaning unit including an inverted funnel member having a stack extending upwardly from said funnel, mouths depending from the lower end of said funnel member and spaced laterally apart, means for maintaining said unit in such position that said mouths rest a slight distance from the ground, and means for drawing the cereal through said mouths, funnel and stack.

7. In a gleaning machine, a truck, a gleaning unit including a funnel member, a stack extending upwardly from said funnel, mouths depending from said funnel and spaced laterally apart, means for maintaining said unit in such position that said mouths rest a slight distance from the ground, spreaders in front of said mouths to spread the stubble and means for drawing the cereal through said mouths, funnel and stack.

8. In a gleaning machine, a truck, a hopper, a suction motor in communication with said motor, a gleaning unit including a funnel, mouths at the bottom of said funnel, an externally threaded sleeve in the bottom of said hopper, a stack extending upwardly from said funnel through said sleeve, nuts on said sleeve engaging the hopper bottom to hold the sleeve in position, an external flange on the top of said stack, a spring surrounding said stack between the top of said sleeve and said flange, and runners on said unit engaging the ground to maintain said unit in proper position with relation to the ground.

9. In a gleaning machine, a truck, a hopper, a suction motor in communication with said motor, a gleaning unit including a funnel, mouths at the bottom of said funnel, an externally threaded sleeve in the bottom of said hopper, a stack extending upwardly from said funnel through said sleeve, nuts on said sleeve engaging the hopper bottom to hold the sleeve in position, an external flange on the top of said stack, a spring surrounding said stack between the top of said sleeve and said flange, runners on said unit engaging the ground to maintain said unit in proper position with relation to the ground, said stack being formed with vertical slots, and lugs on said sleeve projecting into said slots.

10. In a harvester, a truck, a suction motor on said truck, a hopper on said truck communicating with said motor, a harvester unit including a throat mounted to move vertically in said hopper in accordance with the surface of the ground, a mouth communicating with said throat, a gatherer including rows of stationary pins extending from said mouth toward said throat, a rotary gatherer element having rows of pins arranged to pass between said rows of stationary pins.

11. In a harvester, a truck, a suction motor on said truck, a hopper on said truck communicating with said motor, a harvester unit including a throat, an externally threaded sleeve fitting in the bottom of said hopper through which said sleeve extends, nuts on said sleeve engaging the respective sides of said hopper bottom, and a gatherer in said unit.

12. In a harvester, a truck, a suction motor on said truck, a hopper on said truck communicating with said motor, an externally threaded sleeve fitting in the bottom of said hopper through which said sleeve extends, nuts on said sleeve engaging the respective sides of said hopper bottom, a harvester unit slidable in said sleeve and including a throat having a gatherer therein, said throat and sleeve being provided with a vertical slot and lug guide means for retaining the throat against rotation in said sleeve.

13. A gleaning machine comprising a plurality of gleaner units each having a plurality of mouths through which the cereal may enter the unit, nozzles depending from said mouths to enter furrows, and means for drawing the seed through said nozzles, mouths and through said unit.

14. In a gleaning machine, a gleaning unit having a mouth through which the cereal may enter, a substantially rigid nozzle depending from said mouth, means for drawing the seed through said nozzle and mouth and through said unit, and means permitting said nozzle to flex as it passes over obstacles on the ground.

15. In a gleaning machine, a gleaning unit having a mouth through which the cereal may enter, a nozzle depending from said mouth, means for drawing the seed through said unit, said nozzle being hinged at the rear to permit it to swing over lumps, and means for normally holding said nozzle in extended position.

In testimony whereof I affix my signature.

FRANK BARTELS.